Figure 2:
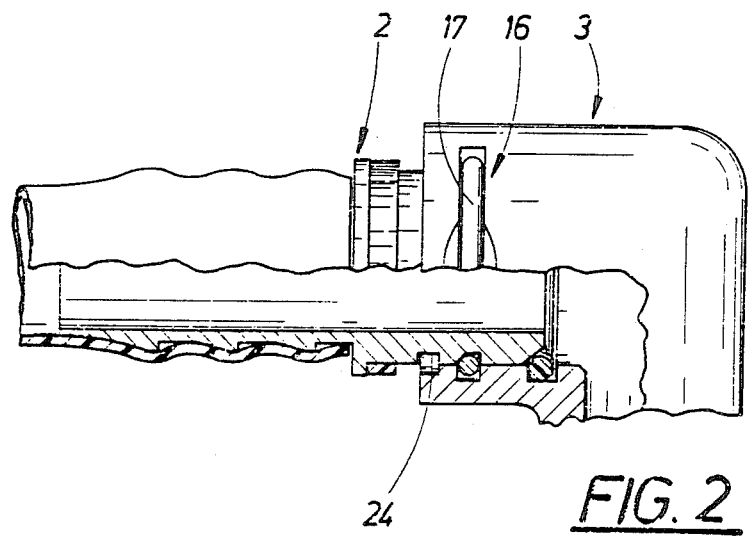

United States Patent [19]

Torgardh

[11] Patent Number: 4,707,000
[45] Date of Patent: Nov. 17, 1987

[54] COUPLING ARRANGEMENT FOR PRESSURIZED MEDIUM LINES

[75] Inventor: Ralph Torgardh, Västra Frölunda, Sweden
[73] Assignee: AB Volvo, Sweden
[21] Appl. No.: 811,772
[22] Filed: Dec. 20, 1985
[51] Int. Cl.$^4$ .............................................. F16L 37/00
[52] U.S. Cl. .................................. 285/305; 285/351; 285/974
[58] Field of Search ........................ 285/305, 351, 924

[56] References Cited

U.S. PATENT DOCUMENTS 3,574,359  4/1971  Klein .............................. 285/351 X

FOREIGN PATENT DOCUMENTS 2454553  11/1980  France .............................. 285/305

Primary Examiner—Richard J. Scanlan, Jr.

[57] ABSTRACT

A coupling arrangement comprising first and second telescoping connecting components which, when telescopingly engaged, are locked by a locking device attached to one of the components and introduced into a first recess in the other component to place the coupling in a first locking position with incomplete sealing and then into a fully connected, locked and sealed position with the locking device introduced into a second recess in the other component.

8 Claims, 6 Drawing Figures

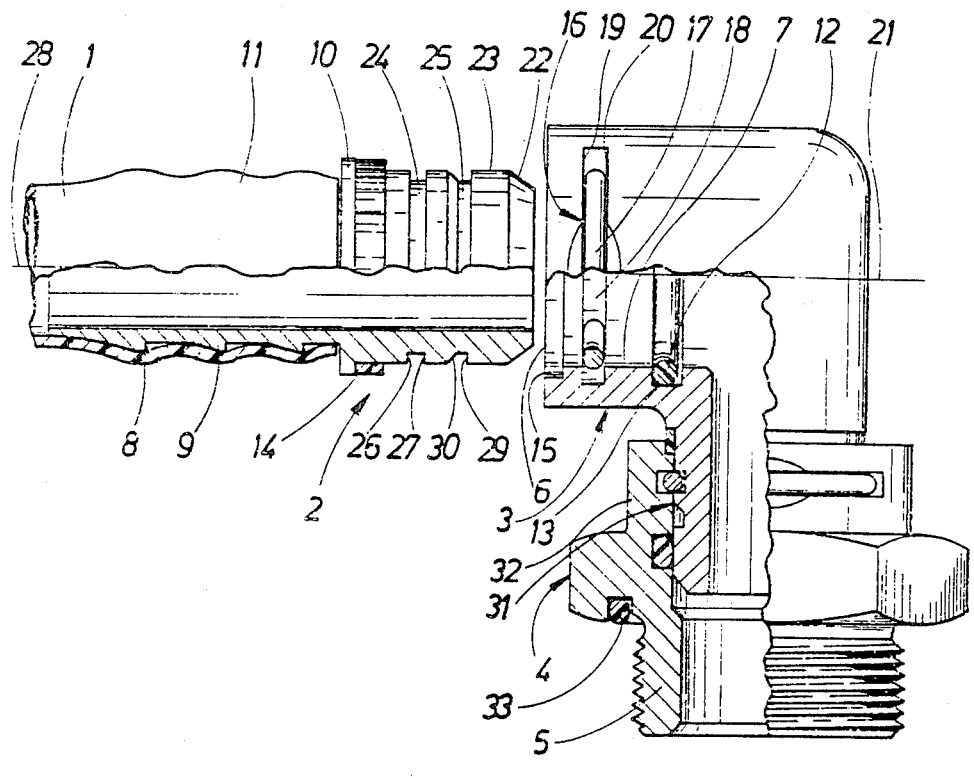
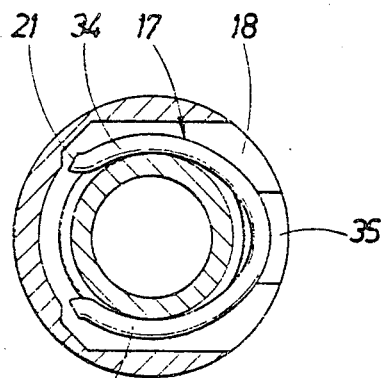
FIG. 1
FIG. 4

COUPLING ARRANGEMENT FOR PRESSURIZED MEDIUM LINES

The present invention relates to a coupling arrangement for pressurized medium lines consisting of at least two connecting components capable of being connected to one another in such a way as to be capable of being separated in the form of a female component and a male component which is capable of being introduced into the female component, in conjunction with which a locking arrangement is so arranged, when in a locked position, as to maintain the connecting components fully connected one to the other and, when in a releasing position, as to permit the coupling components to be separated, said locking arrangement comprising a locking device attached to one of the coupling components and so arranged, when in said locked position, as to be introduced into a recess on the other coupling component, in conjunction with which one or more sealing devices are so arranged, when in said locked position, as to provide a seal between the coupling components.

Conventional coupling arrangements for pressurized air lines, for example, have been found to suffer from the disadvantage that the incomplete connection of the constituent coupling components can result in a loss of pressure during operation resulting from the separation of the coupling components. In the case of conventional arrangements it has been found to be difficult to establish such assembly errors by inspection, which can result in considerable risk of accident due, for example, to the failure of the braking function in braking systems powered by compressed air.

The object of the present invention is to eliminate the disadvantages indicated above by means of a coupling arrangement which exhibits significantly increased reliability during the assembly and inspection of the coupling arrangement and during operation.

The aforementioned object is achieved by means of a coupling arrangement in accordance with the present invention which is characterized in that the aforementioned second coupling component exhibits a further recess in which the aforementioned locking arrangement is first inserted for the purpose of locking the coupling components in an outer locked position as the two coupling components are connected together, in which outer position incomplete sealing is provided, and in which the two coupling components are locked in such a way that they are prevented from being separated, but are able to be brought together further into the first-mentioned locked position for the purpose of fully connecting the coupling components, whereby, in the presence of pressurized medium an indication that the outer locked position has been adopted can be obtained from the obvious leakage of pressurized medium.

Figure 3:
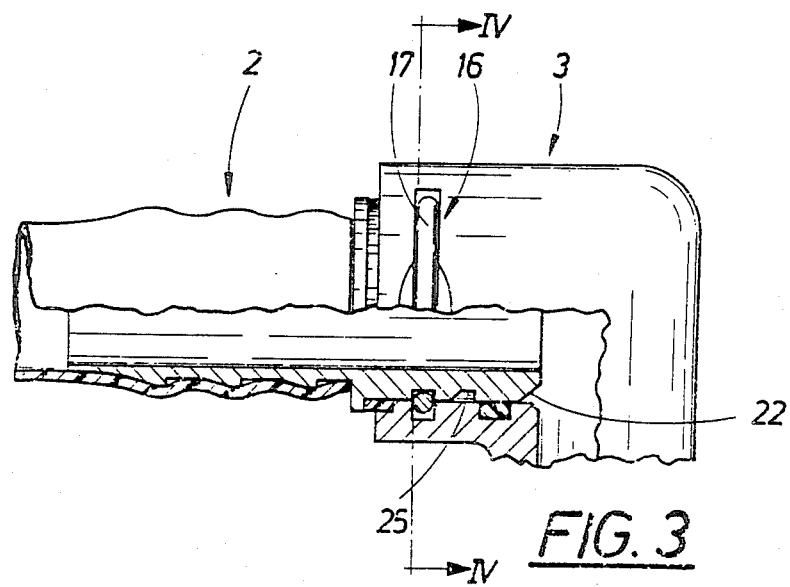
Figure 5:
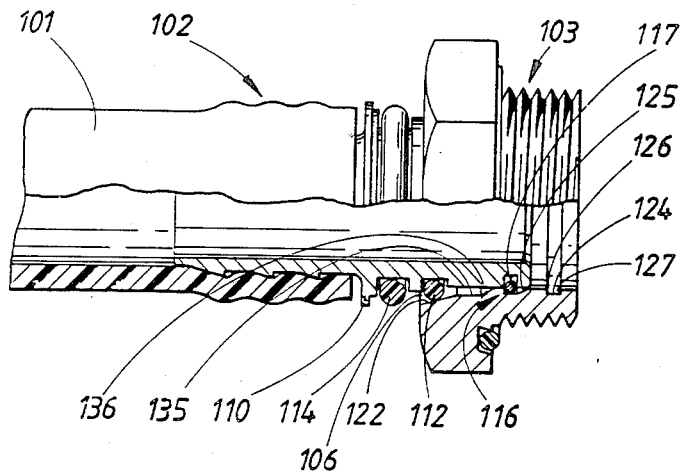
Figure 6:
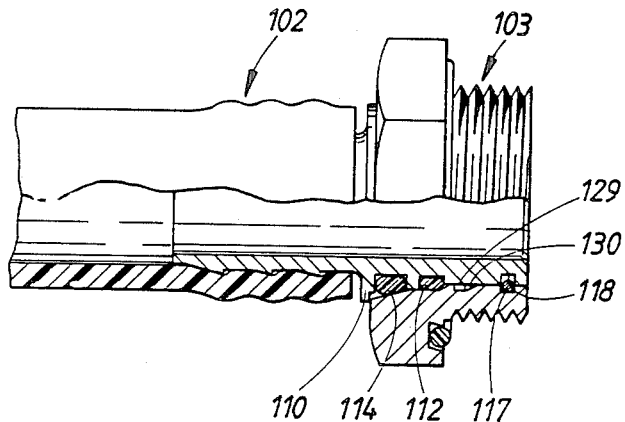

The invention is described below in more detail in relation to a couple of illustrative embodiments, of which FIG. 1 shows a partially sectioned side view of the coupling arrangement in accordance with the invention as a first illustrative embodiment with one coupling point in the separated state and with a second coupling point in the fully connected state, FIG. 2 shows a corresponding view of the coupling arrangement in a partially connected state, FIG. 3 shows a corresponding view of the arrangement in a fully connected state, and FIG. 4 shows a section through the coupling arrangement along the line IV—IV in FIG. 3. FIGS. 5 and 6 show a partially sectioned view of the coupling arrangement in a second illustrative embodiment in a partially connected state and in a fully connected state respectively.

As may best be appreciated from FIG. 1, the coupling arrangement in the first illustrative embodiment consists of three coupling components and is of the elbow coupling type, for example, for the connection of a hose 1 for pressurized medium at an angle to a pressure vessel which is not shown here. The three component parts of the coupling arrangement consist in the example illustrated of a first coupling component 2 in the form of a length of tube onto which is fitted the hose 1, a second coupling component 3 in the form of an elbow, and a third coupling component 4 in the form of a vessel-connecting component which exhibits an external threaded section 5 intended to be screwed into, for example, the wall of the aforementioned vessel. The coupling arrangement in accordance with the first illustrative embodiment exhibits two coupling points which are executed in a similar fashion in accordance with the invention.

The first coupling point is arranged between the length of tube 2 and one end of the elbow 3. The elbow is executed at the aforementioned end in the form of a female component with a circular opening 6 which is transformed into an essentially cylindrical passage 7. The first coupling component 2 is executed at one of its ends in the form of a male component, so dimensioned as to be introduced into the open end 6 of the elbow 3. The opposite end of the length of tube 2 is executed with an attachment stub 8 exhibiting annular ridges 9 for holding one end of the hose 1 which has been pushed on. The other end of the length of tube 2 which serves as a male component is terminated by a stop flange 10, which also forms an end stop for the end 11 of the hose 1. The coupling arrangement exhibits in a conventional manner sealing elements for the purpose of providing a pressure-tight and dirt-protected connection between the coupling components. These consist primarily of an inner sealing ring 12 located in an annular groove 13 in the female component. The sealing ring 12 consists of an elastic 'O'-ring seal executed in an elastic material such as rubber or plastic. A further sealing element 14 is slid onto the male component 2 and makes contact with the stop flange 10. This seal primarily affords protection against the ingress of dirt and dust and is intended to provide a seal through making contact with the walls of an annular groove 15 at the open end of the female component. This sealing element 14 is thus also annular in form and is preferably executed in an elastic material such as rubber or plastic. The sealing element 14 may, for example, be of essentially rectangular cross section, whereas the inner sealing element 12 may with advantage exhibit circular or oval cross-sectional form.

The coupling arrangement in accordance with the invention exhibits a locking arrangement 16 intended to lock the two coupling components securely together in the connected state. The locking arrangement exhibits a locking device 17 which is capable of being adjusted between a releasing and a locking position. In the examples illustrated the locking device 17 consists of a sprung locking ring, the form of which may best be appreciated from FIG. 4. The locking ring is so arranged as to be displaced between a radial first position, which in this first position is a radial inner position, and a radial second position, which is a radial outer position. The locking ring 17 is situated in a recess 18 in the female component with two contact surfaces 19, 20 which run parallel with one another, and each of which extends in its radial plane relative to the longitudinal axis 21 of the female component 3. The locking ring 17 is, as may be appreciated from FIG. 4, bent in the example shown into an oval form and is executed with ends 21 which point away from one another so as to facilitate withdrawal of the locking ring. The recess 18 is open laterally and perpendicularly to the plane of the paper in FIG. 1 so as to permit the locking ring 17 to be inserted and removed.

The coupling component 2 exhibits at its front end a guide surface 22 with a conical surface so arranged, when the male component is introduced into the female component, as to displace the locking ring 17 from the locked position to the releasing position. There extends between the guide surface 22 and the stop flange 10 a sealing surface 23 having essentially the form of a cylinder jacket, the diameter of which, with appropriate clearance, is rather less than the diameter of the cylinder jacket-shaped surface 7 of the female component, but is greater than the internal diameter of the sealing ring 12. The sealing surface 23 in the form of a cylinder jacket is interrupted by two annular grooves 24, 25 in the male component, of which the rear annular groove 24 is a conventional locking groove intended to interact with the locking ring 17, said groove exhibiting in addition to a bottom having, for example, a surface in the form of a cylinder jacket, two transverse contact surfaces extending in different radial planes relative to the longitudinal axis 28 of the length of tube 2. The second locking groove 25 exhibits a contact surface 29 facing away from the end of the male component, that is to say away from the guide surface 22, which similarly extends essentially in a radial plane to the longitudinal axis 28, and an oblique, preferably conical guide surface 30, which is intended to guide the locking ring 17 into its releasing position.

The other coupling point which is present between the elbow 3 and the vessel-connecting component 4 has a sealing and locking arrangement which completely matches the first coupling point. However, the coupling component of the elbow 3 which belongs to this second coupling point is instead executed as a male component 31, whilst the vessel-connecting componet 4 exhibits of sleeve-shaped section 32 which forms the female component. In Fig. 1 this coupling point is illustrated in the fully connected state with the vessel-connecting commponent 4 in the locked position relative to the elbow 3. The locking arrangement 16 is thus identical with the locking arrangement described above, as are the two annular sealing elements 12, 14. The vessel-connecting component 4 exhibits a further elastic 'O'-ring seal 33 to provide a seal against a wall (not shown here) and around the hole in the wall through which the threaded section 5 extends. In the interests of clarity the second coupling point has been broken away in FIGS. 2 and 3.

The function of the coupling arrangement is now described with reference to the first illustrative embodiment and more specifically to the first coupling point, which is shown in three different positions in FIGS. 1, 2 and 3. The two coupling components 1, 2 are connected together by introducing the male component into the female component of the elbow 3. The locking arrangement is now in its unexpanded position, that is to say in a radial inner position with the locking ring 17 exhibiting an identical form to that illustrated in FIG. 1. The locking ring 17 is thus in position inside the female component in the manner illustrated in FIG. 1, in which case the sealing element 12 is located in its groove 13 in the female component, whereas the sealing element 14 is in place on the male component. The latter element may even be positioned in the recess 15 at the open end of the female component. When the length of tube 2 is introduced into the female component and makes contact with its oblique guide surface 22 with the locking ring 17, the latter will be caused to expand to a radial outer releasing position in which the locking ring with its two legs 34 will grip around the cylinder jacket-shaped surface 23 of the male component. Once the male component has been introduced into the intermediate position illustrated in FIG. 2 with the front locking groove 25 situated directly in line with the locking ring 17, the latter will be caused by its spring effect to snap into engagement in the locking groove. The locking ring 17 is, in fact, pre-tensioned in such a way that it constantly endeavours to adopt the radial inner locking position illustrated in FIG. 4. As this snap engagement position is adopted a noise will usually be heard which can be perceived by the user, who, as a result of his training, is thus able to establish that a first intermediate position has been adopted. This intermediate position is an effective locking position to the effect that the male component cannot be withdrawn due to the contact between the locking ring and the contact surface 29. As may be appreciated from FIG. 2 the locking groove 25 is situated at a distance from the guide surface 22 such that the cylinder jacket-shaped sealing surface 23 of the male component has not yet made contact with the sealing element 12. Complete sealing has not, therefore, been achieved at the coupling point. For the purposes of completely connecting together the coupling components the male component is advanced further into the female component for a certain distance, in conjunction with which the locking ring 17 will be caused to expand further through the effect of the oblique guide surface 30 of the locking groove 25 until the male component has been introduced into the position illustrated in FIG. 3, where the rear locking groove 24 is directly in line with the locking ring 17, which thus snaps into engagement in the locking groove and adopts its completely locked position with the two coupling components completely connected together. The locking arrangement will now have adopted the position illustrated in FIG. 4. In this position the cylinder jacket-shaped surface 23 of the male component will have established contact with the sealing ring 13, against which complete sealing will be achieved; see FIG. 3. The dirt-excluding sealing ring 14 will also have come into sealing contact in the annular recess 15. As may be appreciated from FIGS. 2, 3 and 4, the recess 18 exhibits a space to permit the necessary expansion of the legs 34 in a direction away from one another so as to enable the male component to be introduced. A recess 35 is provided in order to faciliate the removal of the locking ring by means of a screwdriver or similar so as to permit the dismantling of the coupling components.

In the second illustrative embodiment shown in FIG. 5 and 6 an opposite solution in accordance with the present invention is portrayed, although this is still based on the general principle of the invention. In this example the components which correspond to those of the first example have been given corresponding reference designations, but in a series higher by 100. The coupling arrangment in accordance with the second illustrative embodiment otherwise consists of only two parts, that is to say a first coupling component 102 and s second coupling component 103, and constitutes a straight coupling in which the first coupling component consists of a length of tube onto which the hose 101 is pushed, and the second coupling component consists of a vessel-connecting component which corresponds essentially in its external construction to the third coupling component in accordance with the first embodiment. The first coupling component 102 similarly exhibits a stop flange 110 and an outer sealing element 114 which mainly affords protection against dirt and dust. The coupling arrangement also exhibits a locking arrangement 116 so arranged as to keep the two coupling components securely locked to one another in an inner, sealing, locked position in accordance with FIG. 6. The opposite construction of the second illustrative embodiment in accordance with FIGS. 5 and 6 involves the locking device 117 of the locking arrangement being arranged in the male component, that is to say being supported by the first coupling component 102, whilst the two locking grooves 124, 125 are arranged in the female component, that is to say the second coupling component 103. The male component also exhibits an inner sealing ring 112 in the form of an elastic 'O'-ring seal, whilst the female component exhibits at its open end 106 a guide surface 122 executed with a conical surface. The two locking grooves 124, 125 are of identical design to the two locking grooves in accordance with the first illustrative embodiment, that is to say with one of the locking grooves exhibiting transverse contact surfaces 126, 127, each of which is situated in its own radial plane, whilst the other locking groove 125 exhibits a transverse contact surface 129 and a conical guide surface 130. The coupling device 117 is also executed in accordance with the second example as a sprung locking ring made of steel, for example, although in its unactuated initial position this is situated in a radial first or outer position and is so arranged as to be forced against the effect of its spring bias into a radial second or inner position.

The coupling arrangement in accordance with the second illustrative embodiment functions as follows. Like the first illustrative embodiment, the connection is entirely mechanical, and its function is released by the two coupling components 102, 103 being separated one from the other so as to correspond with the position in accordance with FIG. 1. For the purposes of connection the first coupling component 102 is introduced through the open end 106 of the second coupling component 103. The locking device 117 will now be brought into contact with the conical guide surface 122 at the open end 106 of the female component. The locking device 117 is forced in this way against the effect of its spring bias into its radial inner position after having passed over a cylinder jacket-shaped part 135 and a second conical guide surface 136 until the locking device 117 snaps ito engagement in the first or front locking groove 125, in conjunction with which the locking device will be slightly sprung open. In this position the first coupling component cannot be withdrawn from the second coupling component because of the contact between the locking device 117 and the contact surface 129 in the first locking groove 125. In this position the sealing element 112 will have been introduced through the open end 106 and will eventually come into tangential contact with the guide surface 122, which can produce a certain amount of stabilization of the first coupling component in the second coupling component, but which does not provide a seal against leakage of the medium which passes through the inside of the two coupling components as they are connected together. The two coupling components exhibit in a conventional manner transcurrent holes which together form a communicating passageway between parts of a pressurized medium system, for example a compressed air system. Once this outer, incomplete coupling position has been adopted, a hissing noise will be heard in the case of a gaseous medium indicating that complete connection does not exist. The first coupling component is now pushed further onto the second coupling component for a certain distance, when the locking device 117 will be permitted to leave the front locking groove 125 via its guide surface 130, which forces the locking device 117 into its radial inner position. Once the locking device reaches the second or rear locking groove 124, the locking device will snap into engagement in it. Complete connection and a locked position will now have taken place as a result of the locking device 117 having been arrested by the contact surfaces 126, 127. The first coupling component is now incapable of axial displacement in any direction, at the same time as complete sealing will have been achieved as a result of the compression of the sealing element 112 into sealing contact with the cylinder jacket-shaped sealing surface 135 of the second coupling component. The sealing element 114 is slightly compressed and is in sealing contact with the guide surface 122 at the open end 106.

Thus, in accordance with the invention, an additional locking position is provided in the form of an intermediate position at which incomplete sealing is provided. It is possible to establish in this way, for example during subsequent inspections of the system when it is filled with the pressurized medium, for instance compressed air, which is to pass through the coupling, the extent to which the inner completely connected position or only the intermediate position illustrated in FIG. 2 has been adopted. This is easily determined by acoustical means by an inspector listening for the leakage of air. If the coupling has been assembled in such a way that the male component is almost fully introduced, but in such a way that complete locking has not been achieved, then the male component may move in a direction outwards from the female component, although such movement can take place only as far as the intermediate position in which the locking arrangement will reliably snap into engagement and will prevent the coupling from becoming fully separated. With the coupling arrangement in its connected state, that is to say both in the intermediate position and in the inner position, the coupling components will together form a transcurrent passageway for the pressurized medium in question because all the coupling components will exhibit transcurrent holes open at both ends.

The invention is not restricted to the illustrative embodiment described above and portrayed in the drawings, but may be modified within the context of the following Patent Claims. It is conceivable, for example, for more than one locking ring to be present. It is also conceivable for the locking ring to be replaced by some other locking element capable of being displaced in a similar fashion between a locked position and a releasing position. The elbow may be replaced by a simple straight sleeve which, instead of being provided with a second coupling point, is provided with a thread for connection to a container or a component corresponding to the attachment tube 8 for the attachment of a hose or for the connection of a tube.

I claim:

1. A coupling arrangement for pressurized medium lines comprising a female coupling component and a male coupling component which can be connected to one another and separated from one another, an open end in the female component for receiving the male component, a locking arrangement for said components which maintains the coupling components fully connected one to the other in an inner locked position and which permits the coupling components to be separated in a releasing position, said locking arrangement comprising a locking device attached to the female component, a first recess in the male component, said locking device being arranged to be introduced into said first recess in the inner locked position of said coupling components, at least one sealing element to provide a seal between the coupling components where they are connected in their inner locked position, a second recess in said male component to which said locking device is first brought for the purpose of locking the coupling components in an outer locked position as the two coupling components are connected one to the other, in which outer locked position incomplete sealing is provided and the two coupling components are locked so that they are prevented from being separated but are allowed to be brought further together into the inner locked position in order to permit the coupling components to be fully connected one to the other, whereby, in the presence of pressurized medium, an indication in the form of an audible sound of leakage that the outer locked position has been adopted can be obtained from the leakage of pressurized medium, said locking device consisting of a locking ring, a slot in the female component, said locking ring being positioned in said slot and arranged to assume a first radial position in said inner and outer locked positions of said coupling components and to be sprung out of said first radial position into a second radial position as the two coupling components are brought together and after passing the outer locked position but before adopting the inner locked position, and the first and second recesses consisting of first and second grooves, respectively, said second groove having a stopping surface located closest to a front end of the male component and facing away from said front end, and an oblique guide surface located behind it, more distant from said front end and so arranged to press the locking ring into its second radial position.

2. A coupling arrangement according to claim 1, wherein one of the coupling components has at its front end a guide surface for the purpose of pressing the locking ring into its second radial position before it adopts the outer locked position.

3. A coupling arrangement according to claim 1, wherein said at least one sealing element consists of an annular, elastic sealing ring, there is an annular groove in one of the coupling components, said sealing ring being housed in said last named annular groove, and there is a sealing surface in the other coupling component, sealing being achieved between the sealing ring and the sealing surface with the coupling components in their fully connected state, the annular sealing ring being located at a distance from the locking device in relation to the position of the second recess relative to the position and extent of the sealing surface such that the annular sealing ring does not make sealing contact with said sealing surface in the outer locked position.

4. A coupling arrangement according to claim 1, wherein said at least one sealing element is supported by the female component in the releasing position.

5. A coupling arrangement for pressurized medium lines comprising a female coupling component and a male coupling component which can be connected to one another, an open end in the female component for receiving the male component, a locking arrangement for said components which maintains the coupling components fully connected one to the other in an inner locked position, said locking arrangement comprising a locking device attached to the male component, a first recess in the female component, said locking device being arranged to be introduced into said first recess in the inner locked position of said coupling components, at least one sealing element to provide a seal between the coupling components when they are connected in their inner locked position, a second recess in said female component to which said locking device is first brought for the purpose of locking the coupling components in an outer locked position as the two coupling components are connected one to the other, in which outer locked position incomplete sealing is provided and the two coupling components are locked so that they are prevented from being separated but are allowed to be brought further together into the inner locked position in order to permit the coupling components to be fully sealingly connected one to the other, whereby, in the presence of pressurized medium, an indication in the form of an audible sound of leakage that the outer locked position has been adopted can be obtained from the leakage of pressurized medium, said locking device consisting of a locking ring supported by the male component and arranged to assume a first radial position in said inner and outer locked positions and to be sprung out of said first radial position into a second radial position as the two coupling components are brought together and after passing the outer locked position but before adopting the inner locked position, and the first and second recesses consisting of first and second annular grooves, respectively, said second groove having a stopping surface located closest to said open end of the female component and facing away from said open end and an oblique guide surface located behind it, more distant from said open end and so arranged as to press the locking ring into its second radial position.

6. A coupling arrangement according to claim 5, wherein one of the coupling components has at its front end a guide surface for the purpose of pressing the locking ring into its second radial position before it adopts the outer locked position.

7. A coupling arrangement according to claim 5, wherein said at least one sealing element consists of an annular, elastic sealing ring, there is an annular groove in one of the coupling components, said sealing ring being housed in said last named annular groove, and there is a sealing surface in the other coupling component, sealing being achieved between the sealing ring and the sealing surface with the coupling components in their fully connected state, the annular sealing ring being located at a distance from the locking device in relation to the position of the second recess relative to the position and extent of the sealing surface such that the annular sealing ring does not make sealing contact with said sealing surface in the outer locked position.

8. A coupling arrangement according to claim 5, wherein said at least one sealing element is supported by the male component in one position.

* * * * *